United States Patent [19]
Desblache

[11] 4,106,102
[45] Aug. 8, 1978

[54] SELF-ADAPTIVE DIGITAL FILTER FOR NOISE AND PHASE JITTER REDUCTION

[75] Inventor: André Eugène Desblache, Nice, France

[73] Assignee: International Business Machines Corporation, Armonk, N.Y.

[21] Appl. No.: 742,150

[22] Filed: Nov. 15, 1976

[30] Foreign Application Priority Data

Dec. 18, 1975 [FR] France .................... 75 39629

[51] Int. Cl.² ........................................ G06F 15/34
[52] U.S. Cl. .................................... 364/724; 325/477
[58] Field of Search ............... 235/152, 156; 325/42, 325/323, 477; 333/17 R; 364/724

[56] References Cited

U.S. PATENT DOCUMENTS

| | | | |
|---|---|---|---|
| 3,562,675 | 2/1971 | Urell | 325/477 X |
| 3,760,167 | 9/1973 | Schrimshaw | 325/42 X |
| 3,889,108 | 6/1975 | Cantrell | 235/152 |
| 3,908,115 | 9/1975 | Waggener | 235/152 |
| 4,027,250 | 5/1977 | Lang | 325/323 |

*Primary Examiner*—David H. Malzahn
*Attorney, Agent, or Firm*—John B. Frisone

[57] ABSTRACT

A new adaptive digital tuning filter for tracking a sinusoidal signal within a frequency band is described. The input signal representative of both said sinusoidal signal and noise is fed to a Hilbert transformer which provides the in-phase and quadrature components, $x_k$ and $\hat{x}_k$, respectively, of said sinusoidal signal. These components are applied to the input of a filter having a transfer function K where $$K = \frac{Z - e^{j\phi}}{Z - ae^{j\phi}}$$

where
$\phi = 2\pi fT$, $f$ is the tuned frequency of the filter,
T is the signal sampling period and $a$ is a constant close to unity.

The output signals $y_x$ and $\hat{y}_x$ of the filter are applied to a computing means which provides a frequency control signal $e_k$ such that $$e_k = \overline{x_k \hat{y}_k - y_k \hat{x}_k}$$

The above value of $\phi$ is adjusted through a conventional gradient method where $$\phi_{k+1} = \phi_k + \mu e_k$$

and controls are provided to adjust $\phi$ in a direction to change $e_k$ toward zero.

Application of the adaptive tuning filter to cancellation of the main component of phase jitter in a modem is also described.

3 Claims, 4 Drawing Figures

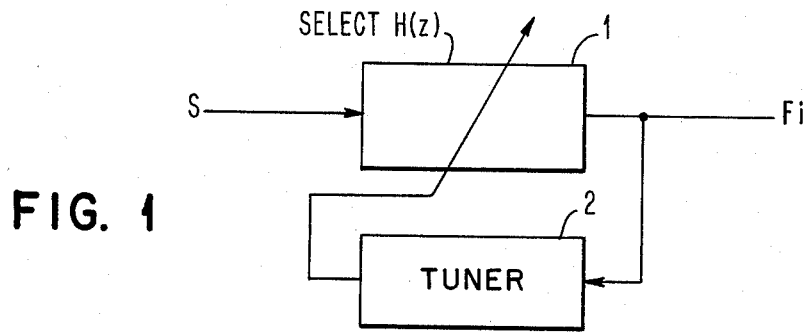
FIG. 1
FIG. 3
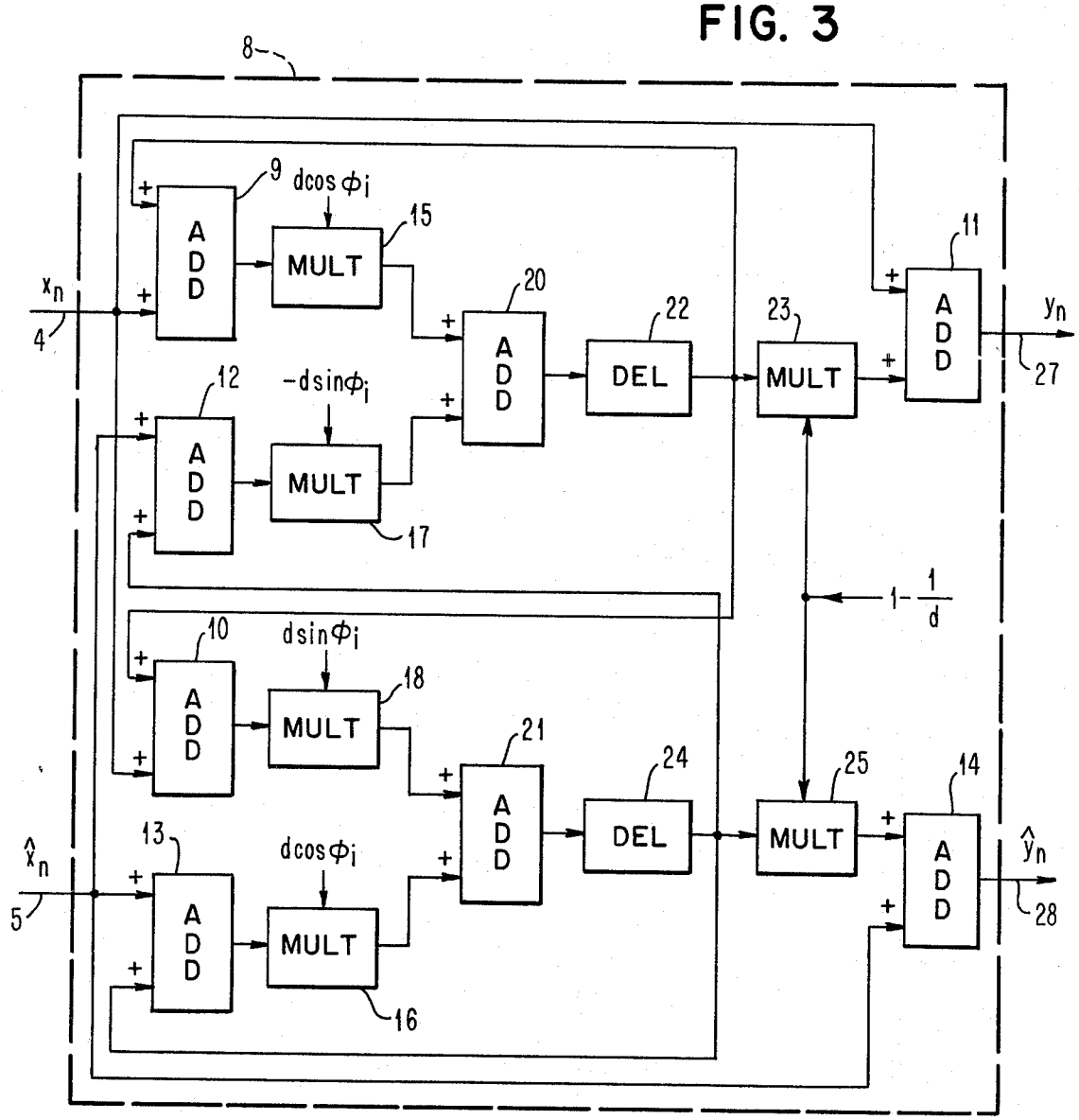

SELF-ADAPTIVE DIGITAL FILTER FOR NOISE AND PHASE JITTER REDUCTION

This invention relates to adaptive digital filters and, more particularly, to an adapter or tuner device for use in a self-adaptive frequency selecting or frequency rejecting digital filter.

Digital filters are being increasingly utilized in a large variety of fields such as those dealing with data transmissions, radar, digital controls, etc. Such increasing use of digital filters can be explained by the fact that they are more steady, accurate and reliable than conventional analog filters. Digital techniques also make it possible to achieve narrow bandwidth filters of excellent quality. It can easily be understood that there is substantial interest in the use of such filters for extracting the pilot frequency in a modem receiver or in a current carrier system utilizing a frequency-division multiplex technique. In most of these applications, the frequency of the received signal fluctuates either because the transmitter frequency drifts or because of the noise signals which adversely affect the information, or useful, signal passing through the transmission channel.

It would, therefore, be desirable to be able to achieve narrow bandwidth filters which could also track the frequency drifts of the useful signal so as to detect its presence at the input of a receiver in spite of said drifts, and to isolate the same. In other words, frequency selecting, self-adaptive narrow bandwidth filters appear to be of high interest.

When the signal to be detected is a noise frequency, the purpose of the filter is to isolate it in order to separate it from the information signal. The filter, then, is of the so-called frequency rejector type. As a matter of fact, the problem to be solved is the same in both cases; the rejection of the noise frequencies is carried out by isolating them and, then, by eliminating them from the original signal. In any event, the purpose of this invention is to have a means for providing a self-adaptive, frequency selecting narrow bandwidth filter.

Furthermore, the noise rejection problem is complicated by the fact that this noise is superimposed on the useful signal. It must, therefore, be eliminated without adversely affecting this useful signal too much. In such a case, the purpose is to achieve filters which can be adapted to the noise characteristics and the variations thereof. In order to make this last remark clearer, there will be mentioned, by way of an example, the case of noise resulting in a phase jitter in phase-modulation transmission systems. In those systems, the digital information to be transmitted is converted so as to denote a carrier frequency phase. This phase may assume a number of well defined discrete values, each denoting a combination of bits of the digital information to be transmitted. On the reception side, it is sufficient, therefore, to detect the presence of a signal having one of the contemplated phases to deduce the corresponding digital combination, therefrom. Unfortunately, the carrier phase is subject to many alterations before reaching the receiver. It is, more specifically, subject to a phase jitter which is a random noise effect, not well-defined, but which is supposed to be due mainly to the influence of parasitic signals generated principally by 20 Hz ringing currents, or by 50 or 60 Hz voltage supplies, and the harmonics thereof. The whole effect is to supply a noise with a frequency spectrum within the 0 to 300 Hz bandwidth. Phase jitter is usually eliminated, or its influence is minimized, by making use of an extremely heavy and complex predictive system which is, therefore, particularly bulky and expensive. By way of an example, there will be mentioned the system disclosed in U.S. Pat. No. 3,972,000, issued July 27, 1976 to A. E. Desblache et al and assigned to the assignee of this application and having the title "Phase Filter for Reducing the Effects of the Noise Components Altering Discrete Phase Modulated Signals." In some applications where the cost is an important factor in the choice of the circuits to be utilized, the use of such a device is to be avoided.

When analyzing the noise spectrum of the so-called phase jitter, it has been observed that the amplitude of the components varying about 20, 50 or 60 Hz is normally predominant. Therefore, should these frequencies be tracked and isolated from the signal by means of an auto-adaptive narrow bandwidth filter, it should be possible to minimize the effect of this noise without having to use the costly and bulky filter disclosed in the above-mentioned patent.

Of course, it is also true that frequency tracking narrow bandwidth filters are very useful in many other applications.

Therefore, the object of this invention is to provide an auto-adaptive, narrow bandwidth, frequency selecting, digital filter.

This invention will be further explained, by way of a preferred embodiment, with reference to the accompanying drawings, in which:

FIG. 1, is a schematic diagram of an auto-adaptive filter.

FIG. 3, is a schematic diagram of one of the elements in the tuner circuit.

FIG. 1 schematically illustrates the filter to be implemented. This filter includes a SELECT filter portion 1 having a narrow bandwidth adjustable to be centered on frequency $f_i$ of the signal component Fi which is to be isolated from an incoming signal S. Since the frequency of this component is assumed to be randomly time-varying while remaining within a limited range and keeping therein a predominant amplitude with respect to those of the other components of S, the tuning frequency of SELECT portion 1 will be varied so that Fi may be tracked. To this end, a tuning circuit 2 is utilized which is designated by TUNER in FIG. 1. This circuit generates the so-called error signal that the whole assembly tends to automatically minimize. In other words, when considering first the error signal, TUNER 2 will operate upon some parameters of SELECT 1 so as to gradually shift the passband of 1 until the error signal tends to zero, e.g., by means of the so-called gradient method.

The SELECT bandwidth filter 1 can be defined by its z-transfer function:

$$H_{(z)} = \frac{1 + cz^{-1} + z^{-2}}{1 + az^{-1} + bz^{-2}}$$

where
$a = -2\mu \cos \phi i$
$b = \mu^2$
$c = -2 \cos \phi i$
$\mu$ being slightly different from 1 (for instance, $\mu = 0.99$) and $\phi i = 2\pi fi \cdot T$, where $fi$ is the frequency of the desired signal F$i$ and T is the sample period of the samples appearing at the input of filter 1. The center frequency of the bandwidth of filter 1 can then be moved by varying $\phi i$. Therefore, the purpose will be to obtain an error signal ERR at the output of TUNER 2 which will approximate zero when SELECT 1 is duly tuned on frequency $fi$ which, in the considered frequency range, is of a predominant amplitude and which will be used to modify $\phi i$ until tuning is obtained.

Figure 2:
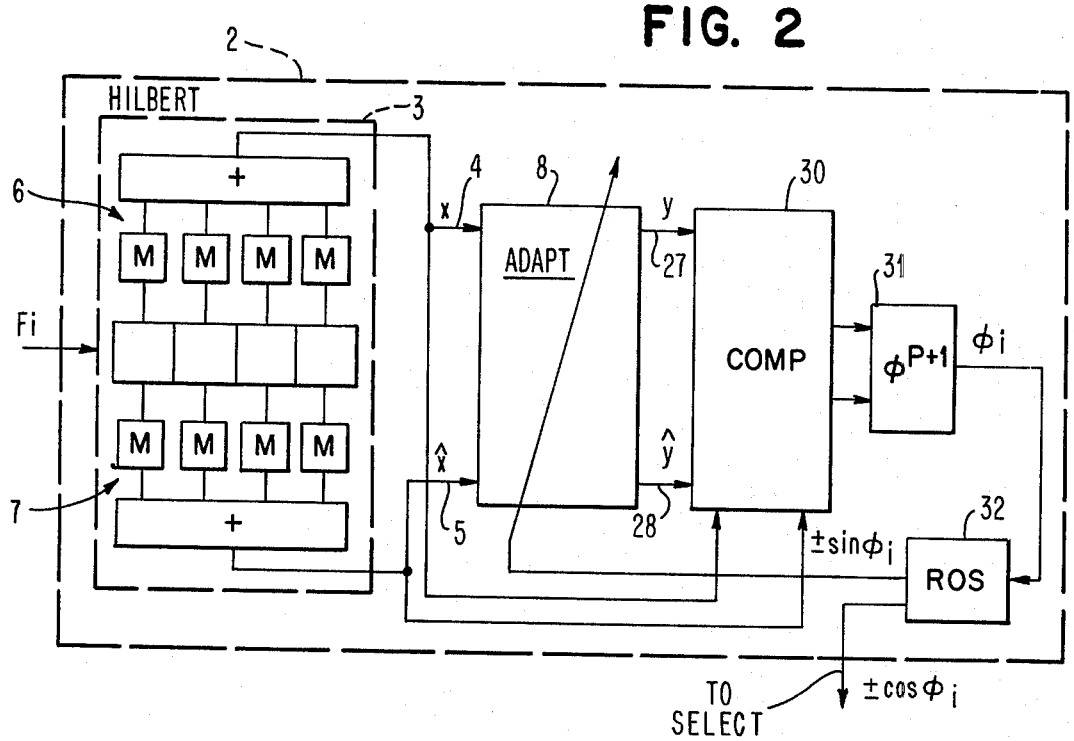
FIG. 2, is a block diagram of the tuner circuit for the filter according to this invention.

As shown in FIG. 2, the TUNER device 2 is comprised of a filter 3 adjusted to the frequency range within which the variations of $fi$ are present, which device 3 will produce two quadrature components, $xn$ on line 4 and $\hat{x}n$ on line 5, of the filtered signal. A so-called Hilbert transformer (i.e., two transversal in-phase quadrature filters 6 and 7) makes it possible to perform these functions. The Hilbert transformer will drive an ADAPT circuit 8 which is also a variable bandwidth filter verifying relationship:

$$K_{(z)} = \frac{z - e^{j\phi i}}{z - d e^{j\phi i}}$$

with "d" approaching unity ($d = 0.9$, for instance). The circuit 8 can be implemented as shown in the schematic diagram of FIG. 3. It will, then, include the two inputs 4 and 5 receiving $xn$ and $\hat{x}n$, respectively. The input 4 receiving $xn$ is connected to the first input of each of three adders 9, 10 and 11. The input 5 which receives $\hat{x}n$ is connected to the first input of each of three adders 12, 13 and 14. The outputs of adders 9 and 13 are inputs to multipliers 15 and 16, respectively. The second input of each multiplier 15 and 16 receives $d\cdot\cos \phi i$. The outputs of adders 10 and 12 are multiplied by factors $-d\cdot\sin \phi i$ and $d\cdot\sin \phi i$ in multipliers 17 and 18, respectively. The outputs of multipliers 15 and 17 drive an adder 20 and the outputs of multipliers 16 and 18 are inputs of an adder 21. The output of adder 20 is delayed for a period of T in delay 22 and then is applied to inputs of adders 9 and 10 and to a multiplier 23, simultaneously. The output of adder 21 is also delayed for the period T in delay 24 and is then applied to an input of adders 12 and 13 and to an input of a multiplier 25, simultaneously. The second inputs of multipliers 23 and 25 each receive a factor representing a coefficient $(1 - 1/d)$. Their outputs respectively drive inputs of adders 11 and 14, the outputs of which supply the mutally in-quadrature components $yn$ and $\hat{y}n$ on output lines 27 and 28.

A computing circuit 30 is supplied the factors $xn$, $\hat{x}n$, $yn$ and $\hat{y}n$ on lines 4, 5, 27, and 28 to generate the term $(xn\,\hat{y}n - \hat{x}n\,yn)$ and it also computes the average $\overline{xn\,\hat{y}n - yn\,\hat{x}n}$ of a number of the last samples, say $2N + 1$ samples, i.e.

$$\overline{xn\,\hat{y}n - yn\,\hat{x}n} = \frac{1}{2N+1} \sum_{n=-N}^{N} (xn\,\hat{y}n - yn\,\hat{x}n).$$

When SELECT filter 1 is perfectly tuned to the frequency of the desired signal, it can be shown that $\overline{xn\,\hat{y}n - yn\,\hat{x}n}$ is zero. The value of this average, therefore, is representative of an error signal ERR which is to be reduced toward zero. Therefore, $\phi i$ will be adjusted by ERR to perform the tuning operation by means of a gradient method. This means that, at a step p of the tuning operation, $[\phi^{p+1}]$ circuit 31 computes the value of $\phi i$ to be utilized during the following step, namely the $(p + 1)$ th step by utilization of the relationship $$\phi i^{p+1} = \phi i^p + \mu_1 \overline{(xn\,\hat{y}n - \hat{x}n\,yn)}$$

where $\mu_1$ is a constant chosen at the beginning in order to speed up the iterative procedure of the gradient method. The schematic diagram of FIG. 2, then, terminates with the $[\phi^{p+1}]$ adjusting device 31 which produces a new value to be used for the next sample and which is referred to a Read Only Storage 32 contining a set of factors. Addressing the table by the new term $\phi i^{p+1}$ will produce the factors $\pm \cos \phi i$ and $\pm \sin \phi i$ which are then, utilized to adjust filters 6 and 7 to produce the factors on lines 4 and 5 to be applied to the inputs of adders 9, 10, 12, and 13 to generate inputs for multipliers 15 through 18. The structure will then be an auto-adaptive narrow bandwidth filter.

As mentioned above, such a circuit can be utilized in many applications for it is possible, with such a circuit, to both track and isolate a given component and, if need be, to eliminate it from the incoming signal.

As an example of a use of such a circuit, it will be shown how the circuit can be utilized in a digital reception system receiving a phase modulated signal. As mentioned above, the phase of the received signal, which will be referred to, here, as $\phi'$, is carrying the useful information. Indeed, it is comprised of a portion $\phi$ the value of which, at well-defined given time-instants, is directly representative of the digital value of the transmitted data. Unfortunately, $\phi'$ carries also noises whose effect must be compensated for in order to recover $\phi$.

In general, most of the noise signals come from parameters of the transmission media which introduce disturbances such as intersymbol interference and other noise components which are due mainly to frequency drift, phase intercept and phase jitter, all of which adversely affect the signals transmitted during passage through the transmission media.

Intersymbol interference is produced by an interaction between the successively transmitted signals, which results from amplitude and phase distortions introduced by the transmission media. When the symbol interference noticeably deteriorates the quality of the received signals, it is eliminated or reduced by an appropriate device, such as a line equalizer. For the present description of this invention, it will be supposed that the intersymbol interference has been eliminated from the signal S by an appropriate equalizer.

Frequency drift ($f_s$) is a disturbance which adversely affects the transmitted signals when they are transmitted through a transmission media wherein they are subject to an intermediate processing and, more particularly, when longer distance telephone lines are utilized as transmission media. Such intermediate processing usually involves the translation of the transmitted signals from one frequency band to another one in order to satisfy the network requirements. A frequency drift $f_s$ causes an in-phase drift $(\phi_s) = 2\pi f_s t$, where $t$ is representative of time and which drift directly and adversely affects the phase of the received signal.

Phase intercept ($f_o$) is due to the presence of a difference between the real phase of a given frequency component and the phase corresponding to the ideal phase frequency characteristics, which appears at the ends of the frequency band of the utilized transmission channel. This phase intercept introduces an arbitrary constant ($\phi_o$) into the value of the received phase.

Phase jitter ($\phi_j$) as above noted results from the parasitic frequency modulation of the signals randomly varying when passing through the transmission media. This modulation is very often due to the variations in the power supplied of the devices involved in the carrying out of the above-mentioned intermediate processing operation.

These noise components have no substantial effect in low-speed digital data transmission systems but do interfer with correct data detection in high speed systems. In a system making use of phase-modulation for data transmission, the transmission rate can be increased in a general manner by increasing the number of discrete phase values that the transmitted signal phase can assume. This increase will result in a smaller difference between two adjacent phase values. By way of an example, in a four-phase system, this phase difference between two adjacent signal phases is 90° but the difference is only 22.5° in a sixteen-phase system. In a sixteen-phase system, it is very often impossible to discriminate between two adjacent phase values due to the disturbances which cause the signal phase to drift. For such a system it is, therefore, imperative to provide for a device with which it will be possible to eliminate, or at least attenuate, the noise component effects accompanying the received signal.

From the foregoing, it results that $$\phi' = \phi + \phi_s + \phi_j + \phi_o$$

In order to isolate component $\phi$, the effects of factors $\phi_s$, $\phi_j$ and $\phi_o$ must be eliminated from the signal $\phi'$.

This operation is carried out by means of a phase filter. In a digital processing system, signal $\phi'$ at the phase filter input appears in the form of a random sequence of discrete values $[\phi_n']$, where $\phi_n'$ is representative of the digital value of the $n$th received sample.

This phase can be written:

$$\phi_n' = \phi_n + \xi_n$$

where
- $\phi_n$ is representative of the value at time $t = nT$ of the phase of the signal as transmitted, i.e., is representative of the data, and
- $\xi_n$ is the digital representation of the disturbances or noises as a whole, introduced during transmission, and mentioned above.

In a Q-phase system, i.e., in a system wherein the transmitted signal phase may assume one out of Q discrete values at each sampling time (Q being a positive integer) in order to indicate the data to be transmitted, $\phi_n$ may assume any one of the values $$\phi_n = 0, \frac{2\pi}{Q}, \frac{4\pi}{Q}, \ldots, \frac{2(Q-1)\pi}{Q}$$

whereas $\xi_n$ may be written in the form $$\xi_n = \frac{2\pi}{Q}(a_o + a_1 \cdot n + \alpha_n)$$

where
- $a_o$ is a constant representative of phase intercept $\phi_o$,
- $a_1 \cdot n$ is a digital value indicative of the frequency drift $\phi_s$, and wherein $a_1$ is a constant which will be indicative of the nominal frequency drift between two consecutive sampling times, and
- $\alpha_n$ is representative of a random noise component indicative of phase jitter $\phi_j$.

It can be seen that by normalizing the input signal $\phi_n'$ and multiplying the same by a constant coefficient $Q/2\pi$, there is obtained $$\phi_n' \times \frac{Q}{2\pi} = \frac{Q}{2\pi}(\phi_n + \xi_n) = l_n + b_n$$

with $$l_n = \frac{Q}{2\pi}\phi_n \text{ and } b_n = \frac{Q}{2\pi}\xi_n.$$

where
$l_n$ can assume only one of the integral values from 0 to $(Q-1)$ and $b_n = a_o + a_1 \cdot n + \alpha_n$.

The purpose of the phase filter is to recover $l_n$ by minizing the effects of $b_n$. The above-mentioned patent discloses that it is possible to satisfy this requirement by means of a two-filter predictive system, one filter dealing with the so-called phase intercept and phase drift noises, the other one dealing with the phase jitter.

As shown in FIGS. 9A and 9B of the above-mentioned patent application, these two filters can be series-mounted or parallel-mounted in the system. This invention applies to either arrangement. Its purpose is to provide for a filter which can extract component $\alpha_n$ representative of phase jitter $\phi_j$ by means of an auto-adaptive device such as disclosed above. This description will be limited to a parallel-mounted arrangement making use of the filter according to this invention (see FIG. 4).

Figure 4:
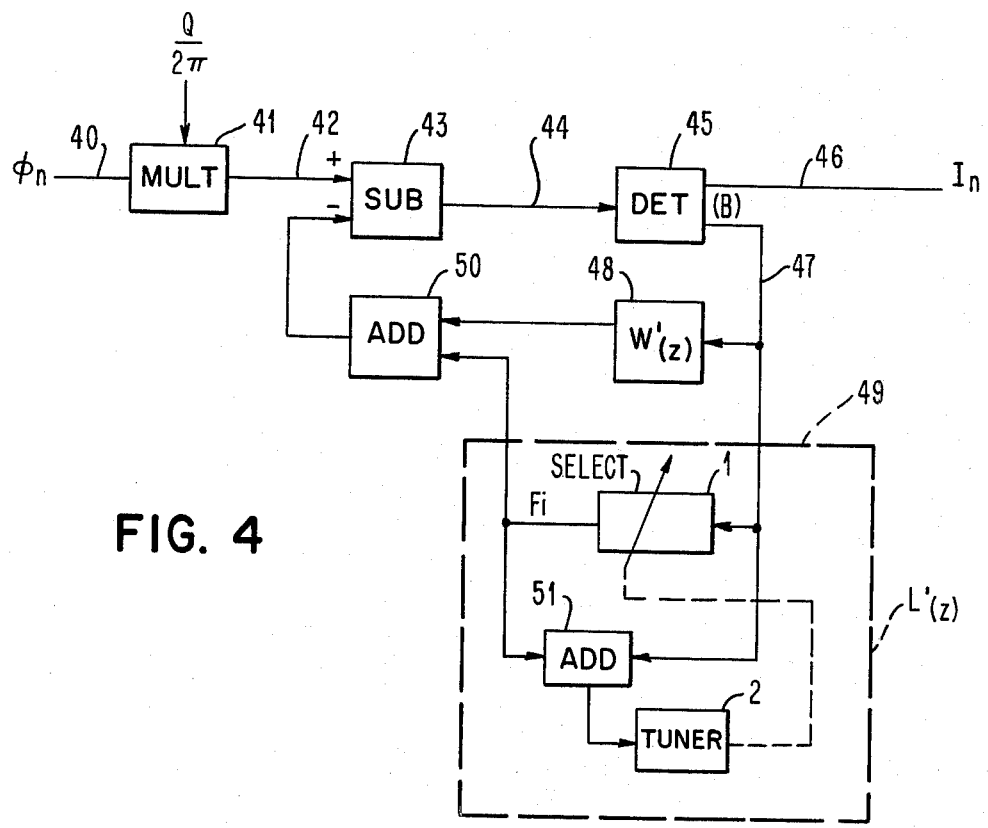
FIG. 4, is an embodiment of the filter according to this invention.

As shown in FIG. 4, signals $\phi_n$ on input line 40 are applied to a multiplier 41 performing a normalization of the samples by multiplying each sample by $Q/2\pi$, its output on line 42 supplies the term $l_n + b_n = l_n + (a_o + a_1 \cdot n + \alpha_n)$. This output is connected to the (+) input of a subtractor 43. The subtractor output line 44 drives the input of the two-output detector 45, one output 46 of which supplies data $l_n$, and the other one 47 which provides the noise part. The noise output 47 is connected to the inputs of two filters 48 and 49 of the type shown in FIGS. 1, 2 and 3 and the z-transfer functions of which are referred to as $W'(z)$ and $L'(z)$. The outputs of these two filters are the inputs to an adder 50, the output of which is connected to the (−) input of subtractor 43. This system is similar to the one shown in FIG. 9B of the above-mentioned patent application. Since it is a predictive system, the noise portion is eliminated from the signal by continual approach. Indeed, when designating the estimated value of $b_n$ by $\tilde{b}_n^p$, at step $m$ of order $p$ in the process, the B output 47 will supply signal $b_n - \tilde{b}_n^p$, or vestigial noise, at the following step $(p+1)$. The term $\tilde{b}_n$ can be written in the form $$\tilde{b}_n = \tilde{a}_o + \tilde{a}_1 \cdot n + \tilde{\alpha}_n$$

and, therefore, B output 47 supplied the term $$(a_o - a_1 \cdot n) - \widetilde{(a_o + a_1 \cdot n)} + (\alpha_n - \tilde{\alpha}_n).$$

The bandwidth of $W'(z)$ filter 48 is such that it passes only the frequencies of those noise signals which correspond to the phase intercept and frequency drift. It can be achieved in conformity with the indications disclosed in the above-mentioned patent. It will then receive the output signal on line 47 and supply, at the step of order $(p + 1)$, the noise term $$\widetilde{(a_o + a_1 \cdot n)}$$

of order $(p + 1)$ since the whole filtering process is predictive.

As to $L'(z)$ filter 49, it will be implemented in the form of the adaptive filter according to this invention. It will, therefore, be comprised of a SELECT narrow bandwidth filter 1 associated with a tuning circuit 2. However, since this adaptive filter is also built in a predictive system, it must also be provided with an adder 51, receiving the input from line 47 and the output of SELECT 1 to provide the input to TUNER 2. Indeed, at step p of the process, SELECT 1 receives the term $$[(a_o + a_1 \cdot n) - \widetilde{(a_o + a_1 \cdot n)} + (a_n - \widetilde{a}_n)]^p$$

at its input; but since it is adjusted on the frequency of the noise resulting from phase jitter, it will supply a new estimated value of $a_n$, namely $\widetilde{a}_n^{p+1}$. Therefore, adder 51 performs operation $$[(a_o + a_1 \cdot n) - \widetilde{(a_o + a_1 \cdot n)} + (a_n - \widetilde{a}_n^p)] - \widetilde{a}_n^{p+1}.$$

For a first approach, one can estimate that values $\widetilde{a}^p$ and $\widetilde{a}^{p+1}$ are only slightly different from each other. The output of adder 51, therefore, supplies a term of approximately:

$$(a_o + a_1 \cdot n) - \widetilde{(a_o + a_1 \cdot n)} + \alpha a_n.$$

If the input TUNER filter 3 (see FIG. 2) is chosen so that it is adjustable over the frequency range within which the random noise variations representative of the phase jitter are standing, the filter 3 will then be sensitive to $\alpha_n$, only and, therefore, will supply an error signal with which it will be possible to adjust SELECT 1 on this phase jitter noise.

It is to be understood that the preceding description of a preferred embodiment has been given only as an example and that numerous structural alternatives are possible without departing from the spirit and scope of this invention as set out in the following claims.

What is claimed is:

1. An auto-adaptive digital filter for tracking a sinusoidal component $Fi$ of a frequency which may vary within a given frequency range, said auto-adaptive digital filter being of the type which includes a narrow bandwidth tunable filter, a feedback loop comprising a tuning circuit which controls the shifting of the center frequency of the passband of said narrow bandwidth tunable filter so as to track said sinusoidal component $Fi$, said tuning circuit including:
   input means for receiving a signal passed through said narrow bandwidth tunable filter;
   a narrow band Hilbert type filter connected to said input means and producing two in-quadrature components $x$ and $\hat{x}$;
   a variable bandwidth filtering means connected to said narrow band Hilbert type filter to receive said in-quadrature components $x$ and $\hat{x}$ and to produce two in-quadrature signals $y$ and $\hat{y}$, said variable bandwidth filtering means having a z-transfer function in the form $$\frac{z - e^{j\phi i}}{z - d e^{j\phi i}}$$

where
$\phi i = 2\pi f i T$,
T is the period of the digital samples fed to the input of said variable bandwidth filtering means, and
$d$ is a constant close to "1," computing means connected to receive the outputs of said narrow band filter and of said variable bandwidth filtering means for determining an average error from factors $x$, $\hat{x}$, $y$, and $\hat{y}$; and
an adjusting means connected to the output of said computing means to receive the information supplied by said computing means and acting to adjust said variable bandwidth filtering means and said narrow bandwidth tunable filter so as to minimize said average error.

2. An auto-adaptive digital filter according to claim 1, in which said adjusting means uses the average error computed by said computing means to determine a value of the factor $\phi i$ which is utilized for adjustment of both said narrow bandwidth tunable filter and as a filter factor in said variable bandwidth filtering means to thereby minimize said average error through an iterative procedure.

3. A predictive type phase filter for reducing the effects of the noise components which adversely affect the value of the phase of a received signal in a digital data transmission system wherein the phase of the transmitted signals can assume any one of Q discrete values representative of data, characterized in that said filter includes:
   an input means for receiving a sequence of digital values indicative of the phase values of the received signal at successive sampling times;
   a subtraction circuit having its additive input connected to said input means for receiving digital representations of phase values;
   a detection circuit connected to said subtraction circuit, for isolating noise components in the received signal;
   a parallel-circuit responsive to the noise component from said detection circuit and being comprised of a passband filter adjusted to pass signals representing a first portion of the components of said noise, and an auto-adaptive digital filter to isolate a second portion of the noise components said auto-adaptive digital filter including;
   a narrow band Hilbert type filter to generate two components $x$ and $\hat{x}$ of a signal applied thereto,
   a variable bandwidth filtering means receiving said $x$ and $\hat{x}$ signals and acting to generate two components $y$ and $\hat{y}$,
   a computing means receiving said four components and determining an average error therefrom, and
   an adjusting means controlled by said computing means to adjust the bandwidth of said variable bandwidth filtering means
   an addition means connected to the outputs of said passband and said auto-adaptive digital filters to sum up said noise components, and
   a connection from the output of said addition means connected to the subtractive input of said subtraction circuit to eliminate the effects of said noise components from said received signal.

* * * * *